United States Patent [19]
Thomas et al.

[11] Patent Number: 5,932,268
[45] Date of Patent: Aug. 3, 1999

[54] FLEXIBLE PARTIALLY COOKED FOOD COMPOSITION

[75] Inventors: David J. Thomas, Eagan; Liza B. Levin, Plymouth, both of Minn.

[73] Assignee: The Pillsbury Company, Minneapolis, Minn.

[21] Appl. No.: 08/690,488

[22] Filed: Jul. 31, 1996

[51] Int. Cl.[6] .................................................. A23L 1/01
[52] U.S. Cl. ........................... 426/549; 426/94; 426/138; 426/560; 426/658
[58] Field of Search .............................. 426/138, 94, 549, 426/560, 658

[56] References Cited

U.S. PATENT DOCUMENTS

| | | |
|---|---|---|
| 1,215,995 | 2/1917 | Roworth . |
| 2,664,812 | 1/1954 | Molina . |
| 3,193,389 | 7/1965 | Dehne . |
| 3,366,487 | 1/1968 | Hughes et al. . |
| 3,394,009 | 7/1968 | Knightly . |

(List continued on next page.)

FOREIGN PATENT DOCUMENTS 0 324 460  11/1989  Germany .

OTHER PUBLICATIONS

Bello, A.B.. et al., American Association of Cereal Chemists, Inc., Cereal Foods World, Methods to Prepare and Evaluate Wheat Tortillas, Mar. 1991, vol. 36, No. 3, pp. 315, 317–318, 321–322.

Finney, K.F. et al, American Association of Cereal Chemists, Inc., Cysteine's Effect on Mixing Time, Water Absorption, Oxidation Requirement, and Loaf Volume of Red River 68, Sep.–Oct. 1971, pp. 540–545..

Friend, Christopher P. et al., American Association of Cereal Chemists, Inc., Cereal Chemistry, Effects of Hydrocolloids on Processing and Qualities of Wheat Tortillas, 1993, pp. 252, 254–255.

Friend, Christopher P. et al., American Association of Cereal Chemists, Inc., Research CFW, Effects of Additives in Wheat Flour Tortillas, Jul. 1995, vol. 40, No. 7, pp. 494–497.

Gomez, M.H. et al., American Association of Cereal Chemists, Inc., Cereal Chemistry, Corn Starch Changes During Tortilla and Tortilla Chip Processing, vol. 69, No. 3, 1992, pp. 275, 277, 279.

Gomez, M.H. et al., American Association of Cereal Chemists, Inc., Cereal Chemistry, Starch Characterization of Nixtamalized Corn Flour, vol. 68, No. 6, 1991, pp. 578–582.

Gorton, L., Bakers Digest, Tortilla Improvements Less fragile, more firm, Nov. 13, 1984, p. 26.

Marcel Dekker, Inc., Food Chemistry, Second Edition, Revised and Expanded, 1985, pp. 630–638.

Seetharaman, K. et al., American Association of Cereal Chemists, Inc., An Approach to Increasing Fiber Content of Wheat Tortillas, vol. 39, No. 6, pp. 444–447.

Serna–Saldivar, S.O. et al., The American Association of Cereal Chemists, Inc., Cereal Foods World, Wheat Flour Tortilla Production, vol. 33, No. 10, Oct. 1988, pp. 855, 857–858, 860–862, 864.

Suhendro, E.L. et al., Effects of Polyols on the Processing and Qualities of Wheat Tortillas, pp. 1–17.

Suhendro, E.L. et al., American Association of Cereal Chemists, Inc., Effects of Added Proteins in Wheat Tortillas, 1993, pp. 1–18.

Yau, J.C., American Association of Cereal Chemists, Inc., Effects of Food Additives on Storage Stability of Corn Tortillas, vol. 39, No. 5, May 1994, pp. 396, 398–399, 401–402.

*Primary Examiner*—Helen Pratt
*Attorney, Agent, or Firm*—Merchant, Gould, Smith, Edell, Welter & Schmidt, P.A.

[57] ABSTRACT

The invention is a method for preparing a partially cooked, flexible food composition. The method includes formulating a dough of flour, water and other dough ingredients. This dough is then formed and partially fried. The partially fried dough composition has a moisture content ranging from about 10 wt-% to 20 wt-%. Also disclosed is a partially fried, flexible dough composition resulting from this method.

17 Claims, 2 Drawing Sheets

U.S. PATENT DOCUMENTS

| | | |
|---|---|---|
| 3,649,304 | 3/1972 | Fehr, Jr. et al. . |
| 3,652,294 | 3/1972 | Marotta et al. . |
| 3,653,915 | 4/1972 | Rubio . |
| 3,655,385 | 4/1972 | Rubio . |
| 3,667,964 | 6/1972 | Frankenfeld et al. . |
| 3,672,912 | 6/1972 | Rubio . |
| 3,687,685 | 8/1972 | Rubio . |
| 3,690,895 | 9/1972 | Amadon . |
| 3,694,224 | 9/1972 | Rubio . |
| 3,709,696 | 1/1973 | Rubio . |
| 3,730,732 | 5/1973 | Rubio . |
| 3,767,421 | 10/1973 | Gulstad et al. . |
| 3,767,422 | 10/1973 | Levitz . |
| 3,792,174 | 2/1974 | Duarte . |
| 3,853,997 | 12/1974 | Rubio . |
| 3,853,998 | 12/1974 | Rubio . |
| 3,859,449 | 1/1975 | Rubio . |
| 3,864,505 | 2/1975 | Hunter et al. . |
| 3,883,671 | 5/1975 | Shatila . |
| 3,928,638 | 12/1975 | Stickle . |
| 3,930,049 | 12/1975 | Mattson . |
| 3,979,525 | 9/1976 | Plemons et al. . |
| 4,004,501 | 1/1977 | Guerrero . |
| 4,018,905 | 4/1977 | Adamek . |
| 4,038,433 | 7/1977 | Manser et al. . |
| 4,055,670 | 10/1977 | Belmont . |
| 4,160,043 | 7/1979 | Stickle et al. . |
| 4,170,659 | 10/1979 | Totino et al. . |
| 4,241,106 | 12/1980 | Tims . |
| 4,273,791 | 6/1981 | Hanson et al. . |
| 4,281,025 | 7/1981 | Longenecker . |
| 4,285,979 | 8/1981 | Izzi . |
| 4,297,378 | 10/1981 | Haasl et al. . |
| 4,367,241 | 1/1983 | Chablaix . |
| 4,456,625 | 6/1984 | Durst . |
| 4,615,888 | 10/1986 | Zallie et al. . |
| 4,690,829 | 9/1987 | Usui . |
| 4,735,811 | 4/1988 | Skarra et al. . |
| 4,748,032 | 5/1988 | Kono et al. . |
| 4,781,932 | 11/1988 | Skarra et al. . |
| 4,803,084 | 2/1989 | Shine . |
| 4,806,377 | 2/1989 | Ellis et al. . |
| 4,857,346 | 8/1989 | Sato et al. . |
| 4,889,737 | 12/1989 | Willard et al. . |
| 4,950,490 | 8/1990 | Ghiasi et al. . |
| 4,961,937 | 10/1990 | Rudel . |
| 5,023,094 | 6/1991 | Van Eijk . |
| 5,167,975 | 12/1992 | Tsurumaki et al. . |
| 5,171,600 | 12/1992 | Young et al. . |
| 5,366,748 | 11/1994 | Villagran et al. . |
| 5,429,834 | 7/1995 | Addesso et al. . |
| 5,433,966 | 7/1995 | Wolt et al. . |
| 6,690,893 | 9/1972 | Rubio . |

FIG. 10

FLEXIBLE PARTIALLY COOKED FOOD COMPOSITION

FIELD OF THE INVENTION

This invention pertains to flour-based food compositions which remain pliable, flexible and supple after being partially fried. More particularly, this invention pertains to dough that may be partially fried, yet retains a moisture content which allows subsequent formation and cooking into a desired finished product.

BACKGROUND OF THE INVENTION

The popularity of partially cooked, ready-to prepare products has increased over the years due to the ease of end consumer preparation and continued improvements in product quality. Examples of partially cooked, ready-to-prepare products include flour-based products, which can be partially cooked by the manufacturer. The end consumer can then complete the cooking process in less time and effort than it would take to make the product from scratch, but can still achieve results similar to a made-from-scratch product.

When a product containing flour is heated, such as during cooking of the product, the starch and protein components of the flour begin chemical and physical transformations. These transformations help to provide the structure and texture of the cooked product. Additionally, heating a flour-based product drives off some of the moisture contained in the flour as well as some of the water which was added to make the flour-based product. The loss of moisture combined with the starch and protein reactions can cause the flour based product to attain a rigidity during the heating process.

It is desirable, with partially cooked products, to provide the end consumer with a product which, when finally cooked, will attain the texture and structure of a fully cooked product made from scratch. In addition, for some partially cooked products, it is desirable to provide the end consumer with a product that is sufficiently flexible such that it can be formed into a desired shape, and even filled or topped with additional ingredients, prior to the final cooking step.

An example of a flour-based product that can be partially cooked by the manufacturer for subsequent forming and final cooking by the end consumer is a food shell, such as a tortilla. Food shells can be used to make various products by combining them with other ingredients to make products such as tacos, quesadillas, flautas, burritos, taco salad shells, taco or tortilla chips, pizzas, enchiladas, piroshkis, stuffed sandwiches, egg rolls, snack food rolls, samosas, taquitas and the like.

Methods for forming flour-based food items such as tortillas, tacos and the like are known in the art. Traditional methods of making tortillas utilize some form of a baking step in combination with additional cooking steps to provide the desired finished product texture and structure.

An example of a known method for the production of a sheeted dough is U.S. Pat. No. 4,950,490, which provides a rigid, friable taco shell from sheeted dough which is partially cooked by frying in fat. The taco shell has a delaminated portion which comprises at least 60% of the taco surface area. The taco shell further comprises at least 4% volatilizable plasticizer, less than 35% total plasticizer and flour that is at least 50% corn flour.

To make a flexible partially cooked product, some sort of post-cooking or post-frying treatment step is also required to provide suitable flexibility to the product. The post-cooking or post-frying step typically includes some sort of hydration or treatment with a plasticizer, and may be combined with a reheating step before the final cooking step.

U.S. Pat. No. 3,930,049 discloses a process for preparing a shelf-stable, flexible tortilla. The process comprises the steps of: (a) lightly frying a hot, pre-baked tortilla to retain 13.5% moisture and sterilize the tortilla, (b) maintaining the fried sterile tortilla at an elevated temperature, and (c) packaging and sealing the fried sterile tortilla in a moisture-proof container. The tortilla is boiled in the container by the end consumer to attain the desired flexibility.

U.S. Pat. No. 4,781,932 discloses a food shell and method of manufacture. The shell comprises more than 25% starch, 20–38% non-volatilizable plasticizer and at least one delaminated portion which comprises more than 60% of the surface area. The shell further comprises a plasticizer and softening agent in the range of 28%–60%. The shell is partially baked (known as par-baked), then fried until the dough is rigid, and finally misted with a softening agent, such as water.

U.S. Pat. No. 4,735,811 discloses a baked tortilla and method of manufacture. The tortilla comprises at least 25% starch, 25–55% plasticizer, with water (less than 25% after cooking), and more than 1.5 water holding capacity.

Fried dough with moisture contents below about 10 wt-% result in a dough product which is rigid. Previous attempts to provide a cooked dough product that is flexible have involved some form of post-cooking treatment to return flexibility to the cooked dough product. An example is U.S. Pat. No. 4,781,932, which adds moisture to the dough after it is baked and fried by misting the rigid cooked dough with a plasticizing agent, such as water. By adding water after the product has been cooked to rigidity, the product can have a moisture content ranging from 8–22%, thereby making it flexible again. Another example is U.S. Pat. No. 3,930,049, in which the cooked dough sealed in a moisture proof container is heated in boiling water by the end consumer to render the product suitably flexible. The consumer then prepares the heated dough product and finishes it by baking.

There is a continuing need for processes for preparing partially cooked food products, such as partially fried food shells, that remain flexible and can be subsequently formed and finally cooked to attain the desired organoleptic qualities.

SUMMARY OF THE INVENTION

In accordance with a first aspect of the invention, there is provided a method for preparing a partially cooked, flexible food composition. The method includes formulating a dough comprising flour and water, and partially frying the dough composition.

In accordance with a second aspect of the invention there is provided a partially fried, flexible dough composition resulting from this method. The partially fried dough composition has a moisture content ranging from about 10 wt-% to 20 wt-%.

In accordance with a further aspect of the invention, there is provided a dough composition which can be cooked to a crisp and tender consistency by cooking the partially fried dough composition resulting from this method.

The invention provides a method of producing a flexible, partially-fried (or "par-fried") dough, such as a tortilla, which remains flexible during storage, that can be formed into a desired shape and cooked by the consumer. The invention does not require a multi-step process involving par-baking, par-frying, and post-cooking treatments to regain flexibility lost in the partial cooking steps.

Instead, the invention provides a flexible, partially cooked product based on partially frying alone. The present invention produces a partially fried product which acquires sufficient surface texture during the par-frying process to provide a desirable finished product texture upon the final cooking by the end consumer, yet retains sufficient flexibility after the partial frying process to be formed into a desired shape prior to the final cooking step.

The invention may be used with any number of doughs prepared with flour or flour-based compositions. The partially fried compositions which are exemplary of this invention include tortillas, flexible taco shells, pizzas, pie crusts, and the like. Generally, the flour based compositions may comprise any number of constituents normally found in doughs and products made from dough including flours, plasticizers, leaveners, emulsifiers, salts, added starches, flavorants, and the like.

The invention comprises preparing a dough and partially frying the dough. To insure the flexibility of the dough after it is par-fried, the dough used according to the invention is a high moisture dough and frying conditions are selected which limit dehydration, but still allow for oil pick-up and a moderately bubbled dough surface texture. The dough comprises flour, water, and other ingredients typically found in dough, such as emulsifiers, leaveners, plasticizers and salt. Because the invention does not require pre-baking, dough moisture is not lost prior to frying. The high moisture dough going into the fryer can be fried for a longer period of time relative to a lower moisture dough or dough that is first par-baked or otherwise cooked prior to entering the fryer. Hence, the proper texture formation and oil pick-up is achieved without the product becoming rigid.

Because the product remains tender and flexible after frying, post-frying treatments to regain flexibility, such as rehydration by water misting or by spraying plasticizers onto the dough surface, are unnecessary. Additionally, the process taught by the invention allows the bubbled surface texture of the par-fried dough to be from about 10% to less than about 60% of the surface area of the dough and still provide desirable texture and tenderness.

DETAILED DESCRIPTION OF THE INVENTION

The invention is a method for preparing a partially fried, flexible food composition. A dough is formulated by combining flour and water with other ingredients typically found in dough. The dough is formed into a desired shape and partially fried. The partially fried dough composition has a moisture content ranging from about 10 wt-% to 20 wt-%. The invention also includes a partially fried, flexible dough composition resulting from this method. The invention further includes a crisp, tender dough composition resulting from cooking the partially fried dough composition resulting from this method. The invention also includes a food product which comprises the partially fried dough composition.

Generally, the doughs used in the invention comprise a processed or unprocessed flour which may either be a white flour or a whole grain constituent. Grains useful for defining the dough of the invention include grain constituents such as flours, germ, and bran from wheat, oats, rye, sorghum, barley, rice, millet, potato and corn among others. Flours may be milled from traditional plant cultivars or hybrid plants, such as so-called "waxy hybrids" of corn.

The dough of the invention further comprises water. Water functions to assist in developing the dough by hydrating the proteins, provides vapor for leavening, and generally provides a formulatory medium for solubilizing and activating the various constituents of the mix. The moisture content of the partially fried product determines its flexibility, so the water initially present in the dough provides moisture needed for a flexible product.

Since water is driven off during the partial frying step, it is desirable to add enough water to account for this moisture loss and still retain flexibility. However, the amount of water added to make the dough should also attain the rheological properties of a dough, without forming a continuous aqueous phase. Typically, the dough comprises about 20 wt-% to about 50 wt-% water. Preferably, the dough comprises about 25 wt-% to about 40 wt-% water.

The doughs may also comprise added ingredients to influence texture of homogeneity of the dough mixture, to increase dough stability, to improve eating quality, and to prolong palatability. We have found that certain functional agents increase the pliability and rollability of the partially fried flour-based food compositions produced by the method of the invention.

One type of ingredient that can be added to the dough is a plasticizer. Plasticizers increase or improve the flexibility or the workability of a polymer based system, such as a dough. Plasticizers can be liquid or solid, and can be volatile or non-volatile. Examples of plasticizers include water, oil, alcohol, glycerol, polyols, mono- and disaccharides, starch hydrolysates, and hydrogenated starch hydrolysates.

Plasticizers that can be used in the invention include oils derived from animal, vegetable, fruit, seed, nut and legume sources, polyols, saccharides, water, converted starches such as maltodextrins, and combinations thereof. Preferably, a combination of volatile and non-volatile plasticizers is used to provide the desired dough consistency and finished product organoleptic qualities. In one preferred embodiment, a combination of water, fat or oil, and glycerol or polypropylene glycol is used as the plasticizer. Typically, the dough of the invention comprises total plasticizers in amounts ranging from about 20 wt-% to about 60 wt-%. More preferably, from about 35 wt-% to about 45 wt-% plasticizer is used in the invention.

Along with other constituents, the dough of the invention may also comprise a leavening agent. Leavening agents useful in the invention include air, steam, yeast, and baking powder such as those containing sodium bicarbonate and the combination of one or more baking acids with sodium bicarbonate. Baking acids useful for chemical leavening and dough mixtures include monocalcium phosphate monohydrate, sodium aluminum sulfate, sodium aluminum phosphate, dicalcium phosphate, glucano-deltalactone, potassium hydrogen tartrate, dimagnesium phosphate, and mixtures thereof. One or more baking acids may be combined with the sodium bicarbonate to form the chemical leavening agent.

Preferably, the dough of the invention comprises an added leavening agent in addition to the steam leavening which occurs when the product is cooked. More preferably, the added leavening agent is a hybrid leavening system comprising a generally fast acting leavening agent and a generally slow acting leavening agent. It is believed that the fast acting leavening agent provides improved texture or rheology when the dough is mixed, and the slow acting leavening agent provides desired textural attributes when the dough is cooked, such as by partially frying the product.

One preferred leavening system which provides this combination of fast and slow acting leaveners is baking powder which combines baking soda or sodium bicarbonate with any of sodium aluminum sulfate, sodium aluminum pyrophosphate, monocalcium phosphate and mixtures thereof.

Other ingredients that can be added to the dough of the invention include emulsifying agents. Emulsifiers typically are surface active agents that stabilize mixtures of hydrophobic and hydrophilic substances by lowering the interfacial tension between usually immiscible substances. Emulsifying agents which may be used include mono- and diglycerides of fatty acids, propylene glycol mono- and diesters of fatty acids, glycerol-lactose esters of fatty acids, ethoxylated or succinylated mono- and diglycerides, lecithin, diacetyl tartaric acid esters or mono- and diglycerides, sucrose esters of glycerol, or equivalents thereof and mixtures thereof. Preferred emulsifiers include mixtures of diacetyl tartaric acid esters, and succinylated mono- and diglycerides. Emulsifying agents may be used singly or in combination with a typical usage level of less than about 3 wt-%.

The doughs of the invention may also comprise any number of other constituents as known to those of skill in the art including sugar, salt, enrichment nutrients, starches and starch-based ingredients, hydrocolloids, dyes, flavorants, and other constituents. Other ingredients which may be added include extenders, preservatives, and food coloring as desired.

Enrichment nutrients which may be added to the dough may include thiamine, riboflavin, niacin, iron, calcium, and mixtures thereof.

A summary of exemplary dough formulas is provided in Table I.

TABLE I

| | (wt %) Dough Formula | | |
| --- | --- | --- | --- |
| | Useful | Preferred | More Preferred |
| Flour | 35–65 | 50–60 | 52–58 |
| Water | 10–50 | 25–40 | 28–32 |
| Plasticizer[1] | 5–20 | 10–15 | 12–14 |
| Salt | 0.1–5 | 1–3 | 1.5–2 |
| Leavener | 0.1–4 | 0.5–3 | 1–1.5 |
| Emulsifiers | 0–3 | 0.5–2 | 1–1.5 |

[1]excluding water

FORMULATION

The invention may be used with any number of flour-based food compositions. The doughs used in the invention may be formulated through any type of dough mixing apparatus known to those of skill in the art. One exemplary formulation process for mixing a dough in accordance with the invention is for making tortillas which includes mixing flour, water, and any other ingredients desired into a suitable mix to form a machineable dough.

The rheology of the dough to be machineable will depend upon the type of flour used, other ingredients present, mixing conditions, and the type of processing equipment used.

Typically, doughs should have a rheology as measured by a Farinograph of between about 600 and 1200 Brabender Units (B.U.), preferably in the range of between about 700 and about 1100 B.U. and most preferably in the range of about 800 and about 1000 B.U. Suitable Farinographs that can be used to measure dough rheology are available from C.W. Brabender Company, Hackensack, N.J. A suitable method for measuring dough rheology is the American Association of Cereal Chemists' Method 54.21. Other methods for measuring dough rheology known to those skilled in the art may also be used.

If wheat flour and yeast are used, either a sponge dough method, straight dough method or a brew method can be used to produce the dough. If proofing is desired it is preferably done after mixing and prior to forming, for example, by letting the dough sit in a dough trough for a selected period of time. After mixing, the dough is then formed into the desired shape, such as a web or dough sheet, by an extruder or sheeting roller as is known in the industry. Alternatively, the dough can be formed into the desired shape by hand.

In an industrial process, the web is then conveyed to a sheeter which sheets the dough with a series of sheeting rollers to the desired thickness. The sheeted dough is then cut into the desired size and shaped item.

The thickness of the cut dough for tortillas or other food shells is preferably in the range of between about 0.2 and 1.5 mm, more preferably in the range of between about 0.5 and 1.0 mm and most preferably in the range of between about 0.7 and 0.8 mm. The unit weight of the cut dough for tortillas is preferably in the range of about 1 to 2 gm/cm$^2$.

The cut dough piece is then par-fried for a period of time at a temperature that provides the appropriate oil pick-up, suppleness, water content, flavor, texture, aroma and taste. The dough is immersed in oil for frying in a suitable frying temperature, for example, from about 300° F. to 400° F., preferably from about 330° F. to 360° F. At the above temperatures, the dough remains in the frying oil for a suitable period of time, for example, about 2 to 60 seconds, preferably from about 5 to 15 seconds, and more preferably from about 8 to 12 seconds. However, the frying time of the dough may vary depending on the dough formulation, heat transfer efficiency of the fryer and frying oil, and the fryer temperature.

The dough emerges from the frying oil in a limber and flexible condition with a good texture and mouthfeel when subsequently prepared, i.e., cooked, and consumed by the end user. Preferably, for a tortilla, the formed dough piece is par-fried at a temperature from about 330° F. to about 360° F. for about 5 seconds to about 15 seconds. Typically the fat content of the tortilla dough after par-frying is from about 15 wt-% to about 30 wt-% and the moisture content of the dough after par-frying is from about 10 wt-% to about 20 wt-%.

The oil temperature and frying time are adjusted so that the dough retains sufficient residual moisture for it to remain flexible and tender and yet have an acceptable fried texture. Typically the dough has a moisture content from about 10 wt-% to about 20 wt-% after frying. Preferably, the dough after frying has a moisture content from about 13 wt-% to about 17 wt-%. The water activity of the dough after frying is preferably from about 0.7 to about 0.9. More preferably, the water activity of the dough is from about 0.75 to about 0.85. Because the dough has a high moisture content compared to a partially baked dough prior to entering the fryer, the dough can be fried for a longer period of time compared to a par-baked dough without becoming overly crisp. Unexpectedly, it has been found that by eliminating any prebaking prior to frying the dough, the partially-fried dough retains sufficient original dough moisture to provide a fried dough having a moisture content in excess of 12–13 wt-% without requiring any post-frying treatments, such as rehydration with added water.

Original dough moisture refers to moisture contained in the dough upon formulating the dough. A majority of the original dough moisture is from the water added to make the dough. Other dough ingredients, such as flour, may also contain moisture contributing to the original dough moisture. Original dough moisture provides the formulatory medium for solubilizing and activating the various dough constituents. The moisture interacts with the starch, protein and other components to form the dough. The moisture is retained within the developed dough matrix and provides the dough with its flexibility and other rheological characteristics. During cooking, the original dough moisture is gradually driven off to provide the final product characteristics.

Post-cooking treatments, however, do not entirely compensate for the moisture lost during cooking. While not intending to be bound by theory, we believe that post cooking treatments, such as by adding moisture back to the cooked product, do not achieve the same result as retaining original dough moisture, even if the percent moisture levels of the products are the same. This is believed to be due to the integral interactions and bonds formed between the dough constituents and the original dough moisture. Once the original dough moisture is driven off by cooking, moisture added back to the cooked product is believed to superficially affect the product rather than permeating through the interstices of the product. In addition, moisture added after cooking the dough may not have the same integral relationship with the dough ingredients, such as starches and proteins, as the original dough moisture, since most of the physical and chemical interactions that occur in the dough upon cooking are irreversible. We believe, therefore, that retaining sufficient original dough moisture by eliminating the baking step, so that post-frying treatments are not needed to obtain a flexible product, results in a partially cooked product having the desired characteristics for final cooking by the end consumer.

When the dough is par-fried, some water is lost from the dough and is replaced by oil. A sufficient amount of oil pick-up is necessary to produce the desired fried flavor, texture and flexibility of the dough.

As a result of frying, the surface of the dough attains a bubbled texture. Bubble formation is caused by increased vapor pressure in the dough and the escape of water from the dough when the dough is fried. A bubble is defined as a thin layer of dough that is separated from the main dough matrix, typically due to the release of steam or water vapor during frying. Traditionally, the extent of bubble formation was thought to be important to achieve a tender texture, with a higher degree of bubble formation (covering more than 60% of the surface area) required for a more tender product. However, the par-fried dough product, such as a tortilla, of the invention requires only from about 10% to about 60% surface area bubble formation, preferably between about 20–40% surface area bubble formation. A summary of the par-fried dough characteristics is provided in Table II.

TABLE II

Par-Fried Dough Characteristics

| | Useful | Preferred | More Preferred |
|---|---|---|---|
| Moisture (wt %) | 10–20 | 12–16 | 13–17 |
| Fat (wt %) | 15–30 | 20–30 | 20–25 |
| $A_w$ | 0.7–0.9 | 0.75–0.85 | 0.77–0.80 |
| pH | 5–8 | 6–7.5 | 6.3–7.0 |
| % Surface Bubbles | 10–60 | 20–40 | 25–35 |

In the method of the invention, the amount of moisture is maximized in the final product by starting with a high moisture dough, omitting the prebaking step, and frying at a lower temperature. These steps result in a flexible, partially fried dough product which does not require post-frying treatments such as rehydration with water to attain the desired flexibility. According to the invention, a tender par-fried food product, such as a tortilla shell, is produced without the requirement for a high level of surface bubble formation. In fact, bubble formation may only be necessary for appearance purposes.

After the dough is prepared and par-fried, it is packaged and ready for the consumer. The consumer arranges the par-fried dough product in a desired configuration and cooks the product until a light and crispy texture is achieved. For example, the consumer can shape the par-fried sheeted dough using a mold. The mold can be of any desired shape and should be capable of withstanding cooking temperatures without being destroyed. Materials for the mold may include stainless steel, cardboard, aluminum, ceramic, and glass. After the par-fried dough is molded, it can be baked at a temperature of about 350° F. to about 400° F. for about 5 minutes to about 15 minutes. Alternatively, the par-fried dough can be cooked by other cooking methods such as frying, microwaving, baking in a toaster or convection oven, and the like to impart a light and crispy texture to the dough product.

The invention may be used for the formation of tortillas and tortilla bowls for taco salads and the like. The invention can also be used as a component of a meal "kit" in which the par-fried dough product is packaged with other meal ingredients, so that the end consumer can combine the ingredients to make a meal. Because the par-fried dough is flexible, it can be formed into a desired configuration and optionally filled prior to distribution, and can be distributed in any desired size or shape, such as an entree or a snack.

The par-fried dough product can be distributed under ambient, refrigerated or frozen conditions, depending on the packaging system used. Under any distribution condition, it is desired that the product not lose moisture during storage, so preferably packaging materials are used which are moisture barriers.

If the par-fried dough product is to be distributed under ambient conditions, preferably the product is packaged in a modified atmosphere package from which substantially all the oxygen has been replaced with a gas, such as carbon dioxide or nitrogen or combinations thereof. Such packaging is typically made of oxygen impermeable materials such as films, foils and the like. If the product is to have ambient shelf stability, the water activity of the product is preferably less than about 0.84. In addition, antioxidant compounds can be added to the dough formula to extend shelf life of the product. If antioxidants are added, they are preferably added by first mixing with an oil or fat, in an amount not exceeding about 200 ppm based on the amount of oil or fat, before being combined with the remaining dough ingredients.

WORKING EXAMPLE

The following example is illustrative of the invention but is not intended to be limiting of the invention.

Dough Preparation

A dough was prepared using the following formula:

| Ingredient | % |
|---|---|
| Wheat Flour | 55.0 |
| Water | 29.8 |
| Oil | 06.0 |
| Glycerol | 06.0 |
| Salt | 01.6 |
| Baking Powder | 01.2 |
| Methylcellulose | 0.40 |

The dough was made by combining all the ingredients in a Hobart mixer and mixing to reach a consistency of about 1000±100 B.U. The dough was relaxed for about 20 minutes prior to being sheeted on a Rondo dough sheeter to a thickness of between about 0.8–1.0 mm. The sheeted dough was cut into circular pieces having a 6 inch diameter, each dough piece weighing about 26±2 grams.

Dough Frying

The cut dough pieces were placed in a batch fryer containing oil at about 330–350° F. and fried for about 10 seconds. The fried dough pieces were removed from the fryer and cooled to room temperature. The cooled par-fried dough pieces were packaged and stored under refrigerated conditions.

Par-Fried Dough Product Analysis

The par-fried dough pieces were analyzed for fat content, moisture content, surface bubbling, and flexibility. As the fryer temperature and residence time increased, the fat content increased and the moisture content decreased. The fat content ranged from 12% to 30%, and the moisture content ranged from 8% to 20%, depending on the fryer temperature and residence time.

The amount of surface bubble formation was measured using a Cambridge Instruments Quantimet 570 Image Analysis system. The percent bubbling was determined by highlighting the outer edge of each blister, then using the Image analyzer to calculate the percentage of bubbled area based on the total surface area of the tortilla. Bubbles are defined as those areas of the dough in which a thin layer of dough is separated from the main dough matrix, usually due to the release of steam during frying. The periphery of each surface bubble blister or delaminated area on the par-fried tortilla surface was highlighted using a black fine point marker. A video camera was used to record an image of the highlighted tortilla, and the image was fed into a computer. The computer, using the Quantimet 570 software, detected the highlighted blister outlines and created a binary image, distinguishing the area inside the blister from the area outside the blister. The area inside the blister was measured by the computer and was then calculated as a percent of the total surface area of the tortilla.

Figure 1:
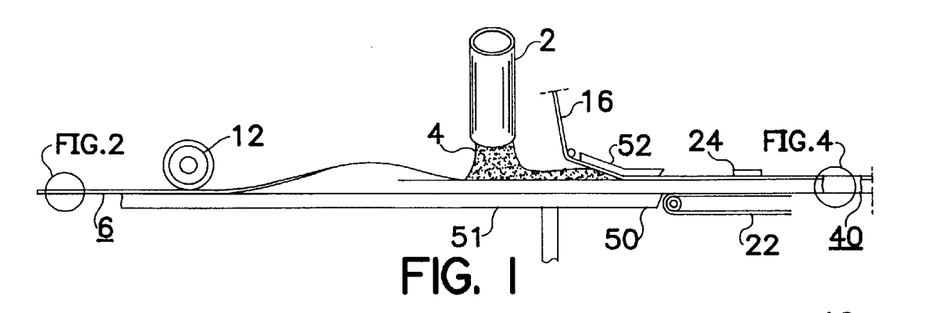
FIGS. 1 and 2 depict the surface of tortillas made in accordance with the invention as subjected to image analysis.
Figure 2:
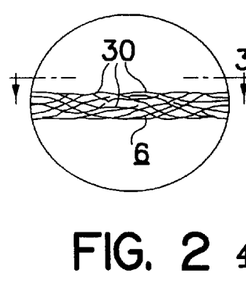
Figure 3:
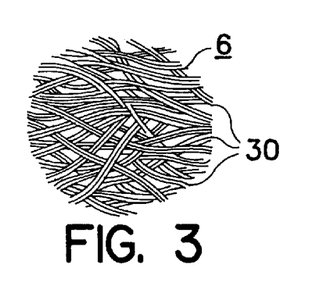
Figure 4:
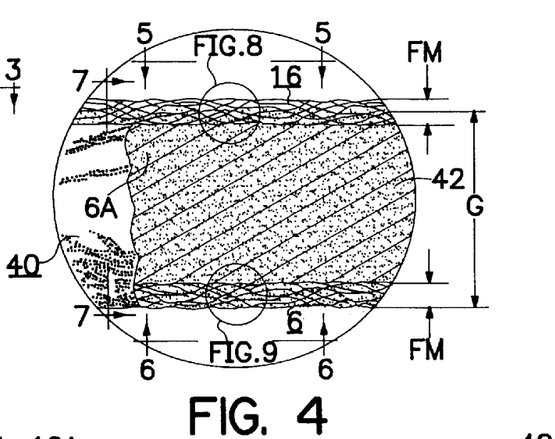
Figure 5:
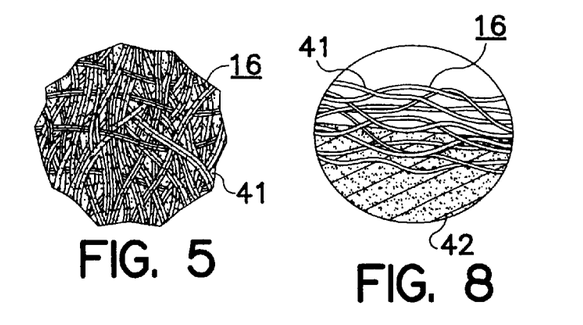
Figure 6:
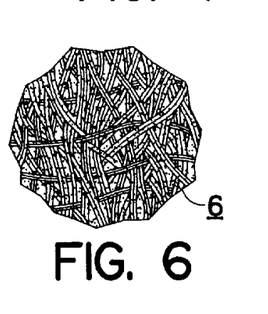
Figure 7:
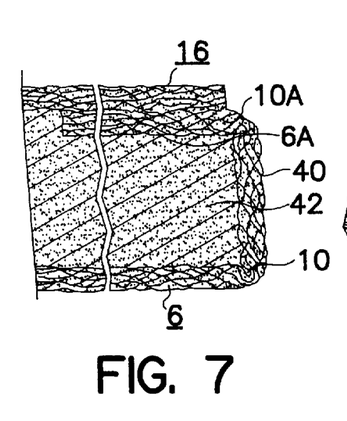

Since the dough product is not pre-baked, bubble formation only occurs during par-frying and is due to the release of small amounts of water vapor from the product. The results in FIGS. 1 and 2 show the amount of surface bubbling is approximately 26% of the total surface area. Although some amount of surface bubbling is probably necessary for an acceptable appearance, it does not appear to be a requirement for a tender and crisp product. Instead of surface bubbling, our results suggest that tenderness is more directly related to the final moisture content and the amount of fat pick-up during frying, with the former being most critical. In order to generate a tender product we found that we had to maintain the final moisture content of the product from about 10% to about 20%, more preferably from about 13% to about 17%.

The flexibility of the par-fried dough product was measured using the method described by C.P. Friend, et al., in an articled entitled "Effects of Additives in Wheat Flour Tortillas," *Cereal Foods World*, July, 1995, pages 494–497.

Par-fried tortillas made as described above were rolled around a 1 cm diameter dowel. The rolled tortilla was observed for cracking and breaking. The par-fried tortillas of the invention achieved a rating of "1" showing no cracking or breaking.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for preparing a partially cooked, flexible food composition without prebaking, said method comprising the steps of:
   (a) formulating a dough comprising flour, and water;
   (b) forming said dough; and
   (c) partially frying said dough composition, wherein said partially fried dough composition has a moisture content of at least about 10 wt-%.

2. The method of claim 1, wherein said dough composition is fried at a temperature of from about 300° F. to 400° F.

3. The method of claim 1, wherein said dough composition is fried for a time period ranging from about 2 seconds to 60 seconds.

4. The method of claim 1 wherein said dough composition is fried in oil at a temperature ranging from about 300 to 400° F. for a period of time ranging from about 2 seconds to 60 seconds.

5. The method of claim 1 wherein said dough composition comprises
   (a) from about 40 wt-% to 60 wt-% flour; and
   (b) from about 10 wt-% to 40 wt-% water; wherein after frying said dough composition has a moisture content ranging from about 10 wt-% to 20 wt-% after frying.

6. The method of claim 1 wherein said flour is derived from a source selected from the group consisting of wheat, oats, rye, sorghum, barley, rice, millet, corn, potato and mixtures thereof.

7. The method of claim 1, wherein said partially fried dough composition has a bubbled texture on between about 10% to about 60% of the surface of the composition.

8. The method of claim 1, additionally comprising a subsequent step of baking said partially fried dough composition to a crisp and tender consistency.

9. The method of claim 1 wherein the dough composition is not par-baked prior to the step of partially frying.

10. A method for preparing a partially cooked flexible food composition without prebaking, said method comprising the steps of:

(a) formulating a dough comprising
   (i) from about 40 wt-% to 60 wt-% flour,
   (ii) from about 10 wt-% to 40 wt-% water; and
   (iii) a balance of dough ingredients ; and
(b) forming said dough; and
(c) partially frying said dough composition wherein said partially fried dough composition has a moisture content ranging from about 10 wt-% to 20 wt-%.

11. The method of claim 10, wherein said dough composition is fried at a temperature of from about 330° F. to 400° F.

12. The method of claim 10, wherein said dough composition is fried for a time period ranging from about 2 seconds to 60 seconds.

13. The method of claim 10 wherein said dough composition is fried in light oil at a temperature ranging from about 300° F. to 400° F. for a period of time ranging from about 2 seconds to 60 seconds.

14. The method of claim 10 wherein said flour is derived from a source selected from the group consisting of bran, oats, rye, sorghum, barley, rice, millet, corn, and mixtures thereof.

15. The method of claim 10, wherein said partially fried dough composition has a bubbled texture on between about 10% to about 60% of the surface of the composition.

16. The method of claim 10, additionally comprising a subsequent step of baking said flexible dough composition to a crisp and tender consistency.

17. The method of claim 10 wherein the dough composition is not par-baked prior to the step of partially frying.

* * * * *

UNITED STATES PATENT AND TRADEMARK OFFICE
CERTIFICATE OF CORRECTION

PATENT NO. : 5,932,268
DATED : August 3, 1999
INVENTOR(S) : Thomas et al.

It is certified that error appears in the above-identified patent and that said Letters Patent is hereby corrected as shown below:

Title page should be deleted to be replaced with the attached title page.

Column 11, claim 11,
Line 10, "330°" should read -- 300° --

Drawing sheets
Figs. 1 and 2, delete "FIG. 1" through "FIG. 10". Insert the correct figures -- FIG. 1 and FIG. 2 --

Signed and Sealed this

Thirtieth Day of October, 2001

Attest:

*Nicholas P. Godici*

NICHOLAS P. GODICI
*Attesting Officer*     *Acting Director of the United States Patent and Trademark Office*

United States Patent [19]
Thomas et al.

[11] Patent Number: 5,932,268
[45] Date of Patent: Aug. 3, 1999

[54] FLEXIBLE PARTIALLY COOKED FOOD COMPOSITION

[75] Inventors: David J. Thomas, Eagan; Liza B. Levin, Plymouth, both of Minn.

[73] Assignee: The Pillsbury Company, Minneapolis, Minn.

[21] Appl. No.: 08/690,488

[22] Filed: Jul. 31, 1996

[51] Int. Cl.$^6$ ............................................. A23L 1/01
[52] U.S. Cl. ........................ 426/549; 426/94; 426/138; 426/560; 426/658
[58] Field of Search ........................ 426/138, 94, 549, 426/560, 658

[56] References Cited

U.S. PATENT DOCUMENTS

| | | |
|---|---|---|
| 1,215,995 | 2/1917 | Roworth . |
| 2,664,812 | 1/1954 | Molina . |
| 3,193,389 | 7/1965 | Dehne . |
| 3,366,487 | 1/1968 | Hughes et al. . |
| 3,394,009 | 7/1968 | Knightly . |

(List continued on next page.)

FOREIGN PATENT DOCUMENTS

0 324 460  11/1989  Germany

OTHER PUBLICATIONS

Bello, A.B., et al., American Association of Cereal Chemists, Inc., Cereal Foods World, Methods to Prepare and Evaluate Wheat Tortillas, Mar. 1991, vol. 36, No. 3, pp. 315, 317–318, 321–322.

Finney, K.F. et al., American Association of Cereal Chemists, Inc., Cysteine's Effect on Mixing Time, Water Absorption, Oxidation Requirement, and Loaf Volume of Red River 68, Sep.–Oct. 1971, pp. 540–545.

Friend, Christopher P. et al., American Association of Cereal Chemists, Inc., Cereal Chemistry, Effects of Hydrocolloids on Processing and Qualities of Wheat Tortillas, 1993, pp. 252, 254–255.

Friend, Christopher P. et al., American Association of Cereal Chemists, Inc., Research CFW, Effects of Additives in Wheat Flour Tortillas, Jul. 1995, vol. 40, No. 7, pp. 494–497.

Gomez, M.H. et al., American Association of Cereal Chemists, Inc., Cereal Chemistry, Corn Starch Changes During Tortilla and Tortilla Chip Processing, vol. 69, No. 3, 1992, pp. 275, 277, 279.

Gomez, M.H. et al., American Association of Cereal Chemists, Inc., Cereal Chemistry, Starch Characterization of Nixtamalized Corn Flour, vol. 68, No. 6, 1991, pp. 578–582.

Gorton, L., Bakers Digest, Tortilla Improvements Less fragile, more firm, Nov. 13, 1984, p. 26.

Marcel Dekker, Inc., Food Chemistry, Second Edition, Revised and Expanded, 1985, pp. 630–638.

Seetharaman, K. et al., American Association of Cereal Chemists, Inc., An Approach to Increasing Fiber Content of Wheat Tortillas, vol. 39, No. 6, pp. 444–447.

Serna–Saldivar, S.O. et al., The American Association of Cereal Chemists, Inc., Cereal Foods World, Wheat Flour Tortilla Production, vol. 33, No. 10, Oct. 1988, pp. 855, 857–858, 860–862, 864.

Suhendro, E.L. et al., Effects of Polyols on the Processing and Qualities of Wheat Tortillas, pp. 1–17.

Suhendro, E.L. et al., American Association of Cereal Chemists, Inc., Effects of Added Proteins in Wheat Tortillas, 1993, pp. 1–18.

Yau, J.C., American Association of Cereal Chemists, Inc., Effects of Food Additives on Storage Stability of Corn Tortillas, vol. 39, No. 5, May 1994, pp. 396, 398–399, 401–402.

*Primary Examiner*—Helen Pratt
*Attorney, Agent, or Firm*—Merchant, Gould, Smith, Edell, Welter & Schmidt, P.A.

[57] ABSTRACT

The invention is a method for preparing a partially cooked, flexible food composition. The method includes formulating a dough of flour, water and other dough ingredients. This dough is then formed and partially fried. The partially fried dough composition has a moisture content ranging from about 10 wt-% to 20 wt-%. Also disclosed is a partially fried, flexible dough composition resulting from this method.

17 Claims, 2 Drawing Sheets

FIG. 1

FIG. 2